Patented Dec. 29, 1936

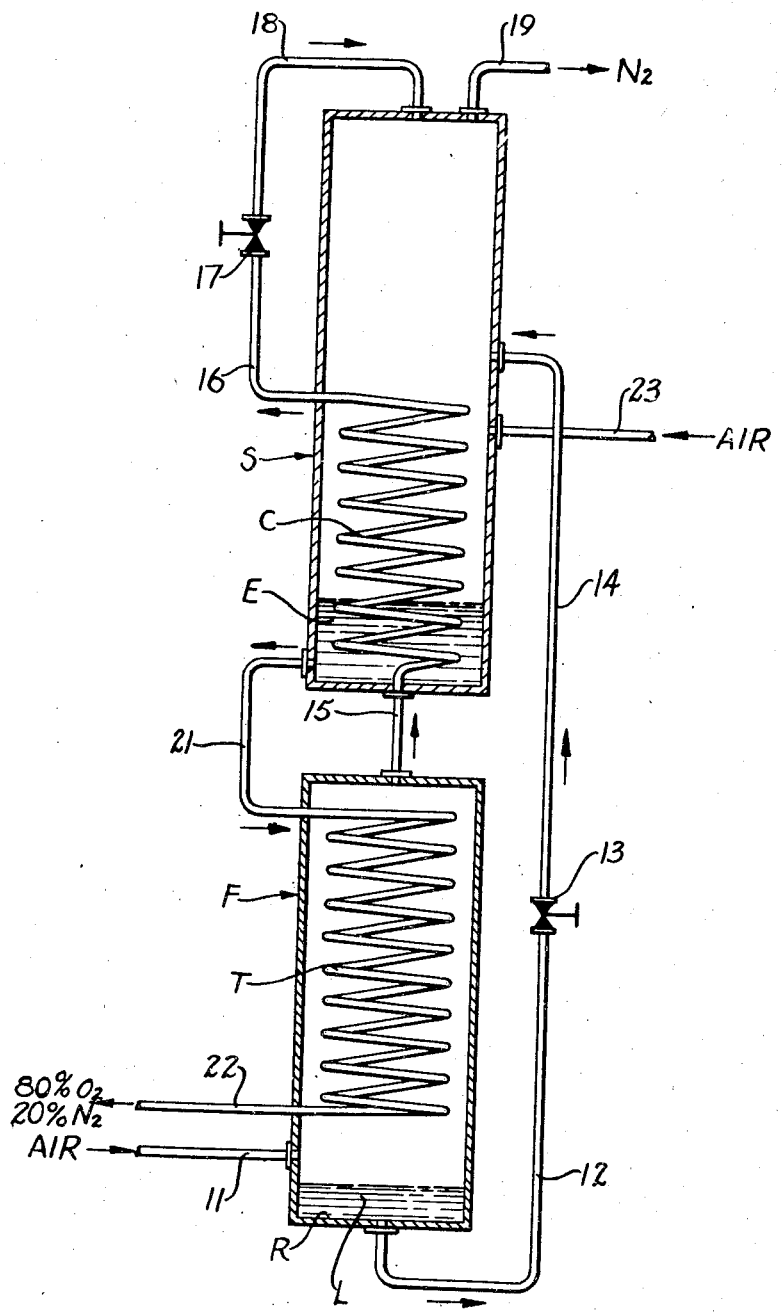

2,066,115

UNITED STATES PATENT OFFICE 2,066,115

PROCESS FOR PRODUCING OXYGEN-ENRICHED MIXTURES FROM AIR

Richard Linde, Hollriegelskreuth by Munich, Germany, assignor, by mesne assignments, to Union Carbide and Carbon Corporation, a corporation of New York Application May 17, 1935, Serial No. 22,038
In Germany May 17, 1934

6 Claims. (Cl. 62—175.5)

This invention relates to a process for producing oxygen-enriched mixtures from air and especially to systems in which air is rectified in two stages.

In producing mixtures of oxygen and nitrogen from air in which the oxygen content is more than approximately forty-five percent, it is customary to condense the air under pressure in a manner which effects partial rectification and to subsequently more completely rectify the mixture into an end-product relatively pure in oxygen, and a high nitrogen concentrate, by exposing the mixture to the washing action of liquid nitrogen.

The nitrogen required as a wash liquid in the second stage of the two-stage separation process is not liquefied in heat exchange with the evaporating oxygen-enriched end-product, as has heretofore generally been the case, but rather with the oxygen-nitrogen mixture which previously had been liquefied in the first separation stage. The liquid end-product, rich in oxygen, which is produced in the second separation stage is utilized by allowing it to flow co-currently with its vapors through condensing passages in the first stage, where the refrigeration evolved during its complete evaporation condenses a portion of the incoming air. To attain the desired high efficiency, the quantity of the evaporated oxygen-enriched end-product should be substantially equal to that of the air liquefied in the first stage. During partial rectification of the liquefied air in both stages, a large portion of the nitrogen content of the air vaporizes from the mixture and passes out of the top of the second separation unit.

The quantity of the mixture being processed thereby decreases as the nitrogen vaporizes, and it would therefore ordinarily be impossible during continuous operation to maintain equal volumes of vaporizing end-product and of liquefying air. This condition is met, however, under the provisions of the present invention by introducing a suitable quantity of additional air into the second separation stage, to compensate for the loss of the volatilized nitrogen by increasing the quantity of oxygen-enriched end-product.

The principal object therefore of the present invention is to provide improved method and apparatus for separating the constituents of air; and to provide for increased efficiency and greater capacity of a rectification apparatus by introducing therein a measured stream of air to compensate for the loss of vaporized nitrogen. Other objects and advantages of the present invention will become apparent from the following detailed description and from the accompanying drawing which is a diagrammatic view of an apparatus adapted for practicing the principles of the invention.

The present process may be more fully understood by referring to the drawing which depicts an apparatus adapted to produce, for example, eighty percent oxygen. Assuming typical operating conditions, ten thousand cubic meters of air, preferably previously freed of moisture, carbon dioxide, and other impurities, and compressed to 3.3 atmospheres absolute, are introduced per hour through the inlet 11 into the bottom of the first separation stage F. This first separation stage F is constructed in the form of a reflux condenser, and is provided with a series of tubes T, of any desirable configuration, indicated in the drawing as a helical coil. The evaporating oxygen-enriched end-product passes downwardly inside these coils, as will be described later, and a portion of the air on the outside of the coils, cooled to below its condensation temperature, condenses and falls as liquid air L to the reservoir R at the bottom of the first unit F. The liquid L thus produced through fractional condensation and partial rectification by contact with ascending vapors contains approximately forty-five percent oxygen. The pressure within the unit F forces the oxygen-enriched liquid air L through pipe 12 and through expansion valve 13, after which it is injected through pipe 14 into the second stage unit or column S at approximately its mid-section. After the liquid air passes the expansion valve 13, it has expanded by throttling action so that when the fluid L enters the second unit S through pipe 14 it is in a very cold condition.

Part of the air which enters through inlet 11 separates as a gas fraction of substantially pure nitrogen and passes out at the top of the first unit F through pipe 15 from which it is conducted upwardly through a second coil of tubing C. The oxygen-enriched liquid air L is sprayed from the end of the pipe 14 over the coils C and cools this tubing to such a degree that the nitrogen rich vapors therein are condensed at substantially the pressure which exists within the first unit F, and the liquid air L which provides the refrigeration for the liquefaction is at the same time partially vaporized and fractionated, losing its more volatile constituents. In order to provide more effective heat exchange it may be desirable to surround the tubes in units F and C with rectification trays in the usual manner. The nitrogen liquefied in the tubing C is conducted through the agency of the pressure difference upward through pipe 16, expansion valve 17, and pipe 18, from which it is sprayed from the top of the unit S as wash liquid to effect more complete rectification of the air being processed. Vaporized nitrogen passes off at the top of the second unit S through outlet pipe 19 while the ascending oxygen vapors are liquefied by heat exchange with the colder wash nitrogen. The end-product E thus formed, which contains approximately eighty per cent of oxygen, collects at the bottom of the second unit S from which it is allowed to flow through pipe 21 leading to the top of the tubular coil T of the first unit F. As the liquid end-product continues in its course downwardly through the tubing T it vaporizes progressively, and absorbs heat from the incoming air to liquefy a portion of the air as has previously been mentioned. The end-product is removed as a vapor through outlet pipe 22. If desired, the mode of operation may be varied slightly by liquefying the wash nitrogen in a simple condenser which is in contact with the oxygen-enriched liquid air produced in the first stage. As the vapors formed during the evaporation of the liquid air rise upwards through the rectification column the nitrogen wash liquid is conducted thereto in the customary manner.

It will be seen that air containing substantially twenty-one percent of oxygen is subjected to fractional condensation and rectification so that the oxygen content of the end-product is increased to eighty percent. Obviously the only change has been a loss of nitrogen and consequently a loss in the amount as compared to the original supply. It is highly desirable in the functioning of the apparatus shown in the figure that the quantity of the liquid end-product descending co-currently with its vapors within the tubing T, shall be the same as the quantity of air condensed in the first stage unit F. Additional end-product is supplied to effect an adjustment by admitting additional or secondary air to the second stage unit S through pipe 23. This air is admitted under relatively low excess pressure and is of a predetermined amount so that the quantity of the liquid formed in the first stage F and the quantity of the liquid end-product are equalized. In the present example therefore, eight-thousand one hundred cubic meters of air per hour, compressed to approximately 1.2 atmospheres absolute, are blown into the upper column S at a point directly below the connection of pipe 14. The secondary air, which preferably has been previously cooled and treated for impurities, is rectified in the second unit S, a large portion of its oxygen content liquefying and collecting about the tubing C while substantially all of its nitrogen passes off through outlet 19 as a gas.

By employing the apparatus and method described all the processed air can be fractionally liquefied and separated at relatively low pressure. Extra refrigeration to compensate for losses by heat leakage into the apparatus in the present process is preferably produced by means of a separate refrigeration process utilizing a small quantity of air compressed to a high pressure. However instead of compressing the secondary air to the pressure of approximately 1.2 atmospheres absolute, which pressure is necessary for simply overcoming flow resistance, it may be compressed to about 2 atmospheres absolute, and after cooling may be expanded, for example in a turbine, so that it may produce external work before being blown into the rectification column. If regenerators are used for eliminating water vapor, carbon dioxide, and other impurities, compressing the secondary air to 2 atmospheres absolute has the advantage of more completely guaranteeing the sublimation of condensates deposited in the cold accumulators, when the pressure difference is thus increased.

The method of operation described may undergo considerable variation. It is possible in the production of oxygen-enriched mixtures containing in excess of eighty percent oxygen, that the quantity of air which is blown in to compensate for the vaporized nitrogen may at some time become so great that the available quantity of wash liquid does not suffice for its separation to the desired degree. In this event a portion of the air to be liquefied in the first separation stage may be condensed by heat exchange with liquid formed in the second separation stage. This may be effected by providing a separate condensing chamber at the top of the first unit F in thermal contact with the fluids in the lower portion of the second unit S, to which fluids heat from the condensing air is imparted. This condensed air may then be used as a supplementary wash liquid to provide for the deficient amount. On the contrary, however, when under certain circumstances it is desired that the end-product have an oxygen content of less than sixty-five percent, it appears that there may be an excess of wash liquid available in the upper column. In this event a portion of nitrogen may be withdrawn in a gaseous state from the first separation stage F and be expanded with the delivery of external work for the purpose of producing the necessary refrigeration to compensate for losses and to supplement or to take the place of an external refrigeration cycle.

If desired, the entire available amount of nitrogen from the lower column may be liquefied and introduced into the upper column, and the quantity of secondary air may be adjusted to utilize the maximum quantity of wash liquid available. It is true that under these circumstances the quantity of liquid end product formed in the second separation stage will be greater than the quantity liquefied in the first separation stage. However, this excess may be employed for the condensation of wash nitrogen, for example, for recondensing a portion of the nitrogen in the reflux condenser F to be used as a wash liquid in column S.

The drawing has been freed of all non-essential details for the purpose of clarity but it is to be understood that any details not shown may be added as will be obvious to any one skilled in the art. The invention is not to be limited strictly to the disclosure as I may prefer to make modifications in the structure and any changes which may properly belong to the invention under the doctrine of equivalents.

I claim:

1. In a process for producing oxygen-enriched mixtures from air in two stages, the step of introducing additional air to the second stage to compensate for the loss of volatilized gases, the amount of additional air being measured to equal the amount of volatilized gases so that a heat balance may be effected in the first stage.

2. In the process of producing oxygen-enriched mixtures from air in two stages; measuring a quantity of air equal to the quantity of vaporized gases, and introducing said air into the second stage unit at a pressure slightly above atmospheric pressure, such measured quantity of air effecting a heat balance in the first stage.

3. The process of producing oxygen-enriched mixtures from air in two stages comprising admitting air under pressure to the first stage, condensing a portion of said air, conducting the vaporized gases from said first stage to the second stage, allowing the condensed portion to expand and come in thermal contact with said vaporized gases, thus liquefying said vaporized gases to form a wash liquid, exposing said condensed portion to the action of said wash liquid to evaporate volatile gases from said condensed portion and to concentrate other gases therein to form a liquid end-product, passing said liquid end-product co-currently with its vapors through said first stage and exposing said end-product in thermal contact with said admitted air.

4. Process according to claim 2, in which at least some liquefaction of said vaporized gases to form a wash liquid is effected by imparting heat from said gases to fluid material in the lower part of said second stage.

5. The process of producing oxygen-enriched mixtures from air comprising fractionally condensing and rectifying air in two stages, evaporating the oxygen-enriched end-product co-currently with its vapors in thermal contact with the incoming air in the first stage, measuring additional air of a quantity equal to the difference in quantity between the air condensed in the first stage, and the liquid end-product, and admitting said air into the second stage.

6. Process according to claim 5 in which said additional air is first compressed to at least two atmospheres and after cooling is expanded with the delivery of external work, to the pressure prevailing in said second stage unit.

RICHARD LINDE.